US010204391B2

(12) United States Patent
Heggelund et al.

(10) Patent No.: US 10,204,391 B2
(45) Date of Patent: Feb. 12, 2019

(54) METHOD OF AND APPARATUS FOR PROCESSING GRAPHICS

(71) Applicant: ARM Limited, Cambridge (GB)

(72) Inventors: Frode Heggelund, Trondheim (NO); Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 1043 days.

(21) Appl. No.: 13/909,556

(22) Filed: Jun. 4, 2013

(65) Prior Publication Data
US 2014/0354682 A1 Dec. 4, 2014

(51) Int. Cl.
G06T 1/20 (2006.01)

(52) U.S. Cl.
CPC .................... G06T 1/20 (2013.01)

(58) Field of Classification Search
CPC combination set(s) only.
See application file for complete search history.

(56) References Cited

U.S. PATENT DOCUMENTS

| | | |
|---|---|---|
| 5,175,808 A | 12/1992 | Sayre |
| 5,305,430 A | 4/1994 | Glassner |
| 5,392,385 A | 2/1995 | Evangelisti |
| 5,500,928 A | 3/1996 | Cook |
| 5,509,110 A | 4/1996 | Latham |
| 5,522,018 A | 5/1996 | Takeda |
| 5,574,836 A | 11/1996 | Broemmelsiek |
| 5,596,685 A | 1/1997 | Ashton |
| 5,729,672 A | 3/1998 | Ashton |
| 5,794,017 A | 8/1998 | Evans |

(Continued)

FOREIGN PATENT DOCUMENTS

| | | |
|---|---|---|
| CN | 1421022 | 5/2005 |
| CN | 1641702 | 7/2005 |

(Continued)

OTHER PUBLICATIONS

DePano, N. A. A., & Pham, T. (Apr. 1991). Minimum enclosing rectangles: a comparative investigation of two optimizing criteria (reprise). InSoutheastcon'91., IEEE Proceedings of (pp. 60-64). IEEE.*

(Continued)

Primary Examiner — Frank S Chen
(74) Attorney, Agent, or Firm — Vierra Magen Marcus LLP

(57) ABSTRACT

A tile-based graphics processing pipeline that uses primitive lists that can encompass plural rendering tiles includes a primitive list reading unit that reads primitive lists for a tile being rendered to determine primitives to be processed for the tile and a rasterizer that rasterizes input primitives to generate graphics fragments to be processed. The pipeline further comprises a comparison unit between the primitive list reading unit and the rasterizer that for primitives that have been read from primitive lists that include plural rendering tiles, compares the location of the primitive in the render target to the location of the tile being rendered, and then either sends the primitive onwards to the rasterizer if the comparison determines that the primitive could lie at least partially within the tile, or does not send the primitive to the rasterizer if the comparison determines that the primitive definitely does not lie within the tile.

15 Claims, 4 Drawing Sheets

(56) References Cited

U.S. PATENT DOCUMENTS

| | | | |
|---|---|---|---|
| 5,844,571 A | 12/1998 | Narayanaswami | |
| 5,864,342 A * | 1/1999 | Kajiya | G06T 11/001 345/418 |
| 5,886,701 A | 3/1999 | Chauvin | |
| 5,949,428 A | 9/1999 | Toelle | |
| 6,204,856 B1 | 3/2001 | Wood | |
| 6,288,722 B1 | 9/2001 | Narayanaswami | |
| 6,304,266 B1 | 10/2001 | Li | |
| 6,326,964 B1 * | 12/2001 | Snyder | G06T 11/001 345/419 |
| 6,344,852 B1 | 2/2002 | Zhu | |
| 6,552,723 B1 | 4/2003 | Duluk | |
| 6,697,063 B1 | 2/2004 | Zhu | |
| 6,798,410 B1 | 9/2004 | Redshaw | |
| 6,911,985 B1 | 6/2005 | Fujimoto | |
| 7,002,571 B2 | 2/2006 | Lake | |
| 7,002,572 B1 * | 2/2006 | Teig | G06T 17/00 345/420 |
| 7,023,437 B1 * | 4/2006 | Voorhies | G06T 15/005 345/419 |
| 7,064,752 B1 * | 6/2006 | Larson | G06T 15/405 345/419 |
| 7,138,998 B2 | 11/2006 | Forest | |
| 7,148,890 B2 * | 12/2006 | Rice | G06T 17/20 345/419 |
| 7,167,171 B2 | 1/2007 | Heim | |
| 7,324,115 B2 | 1/2008 | Fraser | |
| 7,375,727 B1 * | 5/2008 | Greene | G06T 15/405 345/419 |
| 7,418,156 B1 | 8/2008 | Candela | |
| 8,681,168 B2 | 3/2014 | Nystad et al. | |
| 9,317,948 B2 * | 4/2016 | Tapply | G06T 11/40 |
| 2002/0015064 A1 | 2/2002 | Robotham | |
| 2003/0142100 A1 | 7/2003 | Lavelle | |
| 2003/0151608 A1 | 8/2003 | Chung | |
| 2003/0227457 A1 | 12/2003 | Pharr | |
| 2004/0066384 A1 | 4/2004 | Ohba | |
| 2004/0095343 A1 | 5/2004 | Forest | |
| 2004/0227767 A1 | 11/2004 | Baroncelli | |
| 2006/0072831 A1 | 4/2006 | Pallister | |
| 2006/0129908 A1 | 6/2006 | Markel | |
| 2006/0170693 A1 | 8/2006 | Bethune | |
| 2007/0101013 A1 | 5/2007 | Howson | |
| 2007/0146378 A1 * | 6/2007 | Sorgard | G06T 15/00 345/581 |
| 2007/0165035 A1 | 7/2007 | Duluk | |
| 2008/0012878 A1 * | 1/2008 | Nystad | G06T 11/001 345/613 |
| 2008/0150950 A1 | 6/2008 | Sorgard | |
| 2008/0170066 A1 | 7/2008 | Falchetto | |
| 2009/0189898 A1 * | 7/2009 | Dammertz | G06T 15/06 345/426 |
| 2009/0303245 A1 | 12/2009 | Soupikov | |
| 2010/0097382 A1 | 4/2010 | Nystad | |
| 2010/0177105 A1 | 7/2010 | Nystad et al. | |
| 2011/0221743 A1 | 9/2011 | Keall et al. | |
| 2014/0139534 A1 | 5/2014 | Tapply | |
| 2014/0267259 A1 * | 9/2014 | Frascati | G06T 15/005 345/423 |
| 2014/0267300 A1 * | 9/2014 | Barber | G06T 11/40 345/441 |
| 2014/0347357 A1 * | 11/2014 | Kim | G06T 15/005 345/420 |

FOREIGN PATENT DOCUMENTS

| | | |
|---|---|---|
| CN | 1774727 | 5/2006 |
| CN | 101067869 | 11/2007 |
| GB | 2251770 | 7/1992 |
| GB | 2281682 | 3/1995 |
| GB | 2298111 | 8/1996 |
| GB | 2343603 | 5/2000 |
| GB | 2433014 A | 6/2007 |
| GB | 2444628 | 6/2008 |
| GB | 2444628 A | 6/2008 |
| GB | 2444863 | 6/2008 |
| GB | 2433014 | 7/2008 |
| GB | 2488196 A | 8/2012 |
| JP | 2002-526842 | 8/2002 |
| JP | 2003-529859 | 10/2003 |
| JP | 2004-348702 | 12/2004 |
| JP | 2006-521612 | 9/2006 |
| JP | 2008-165760 | 7/2008 |
| WO | WO1990/06561 | 6/1990 |
| WO | WO1995/28685 | 10/1995 |
| WO | WO1997/06512 | 2/1997 |
| WO | WO1998/29838 | 7/1998 |
| WO | WO2000/11605 | 3/2000 |
| WO | WO2000/19377 | 4/2000 |
| WO | WO2000/28483 | 5/2000 |
| WO | WO2001/75803 | 10/2001 |
| WO | WO2001/95257 | 12/2001 |
| WO | WO2004/066059 | 8/2004 |
| WO | WO2004/086309 | 10/2004 |
| WO | WO2004/093012 | 10/2004 |
| WO | WO2005/020582 | 3/2005 |
| WO | WO2005/116930 | 12/2005 |

OTHER PUBLICATIONS

Response to Office Action dated Oct. 28, 2015, in U.S. Appl. No. 13/679,768 filed Nov. 16, 2012.

Notice of Allowance dated Dec. 16, 2015, in U.S. Appl. No. 13/679,768, filed Nov. 16, 2012.

Final Office Action dated Apr. 28, 2015 in U.S. Appl. No. 13/679,768, 12 pages.

Office Action dated Sep. 26, 2014 in U.S. Appl. No. 13/679,768, 110 pages.

A Sorting Classification of Parallel Rendering Steven Molnar, Michael Cox, David Ellsworth, Henry Fuchs, University of North Carolina at Chapel Hill and Princeton University, 1994 IEEE, 11 pages.

Hidden Surface Removal, 2009, 24 pages (as cited with presentation reference provided by Examiner in Office Action dated Sep. 26, 2014 in U.S. Appl. No. 13/679,768).

Chapter 7 Visible Surface Algorithms, pp. 264 to 293 (30 pages) from Max K. Agoston, Computer Graphics and Geometric Modeling: Implementation and Algorithms, Springer-Verlag, London, 2005.

Office Action dated May 9, 2014 in GB Patent Application No. GB1320136.3, 5 pages.

Examination Report dated Mar. 2, 2016, in GB Patent Application No. GB1409839.6.

Response to Office Action dated Jan. 26, 2015 in U.S. Appl. No. 13/679,768, 11 pages.

Hsiao, et al., "A Hierarchical Primitive Lists Structure for Tile-based Rendering," 2009 International Conference on Computational Science and Engineering, pp. 408-413, Aug. 2009.

Xie, et al., "Adaptive Hierarchical Visibility in a Tiled Architecture," 1999 Proceedings of the ACM SIGGRAPH/Eurographics, pp. 75-84, 1999.

Crisu, 3D Graphics Tile-Based Systolic Scan-Conversion, downloaded Feb. 2010, pp. 517-521.

Crisu, Efficient Hardware for Antialiasing Coverage Mask Generation, Jun. 2004, pp. 1-8, (Proceedings of the Computer Graphics International).

Crisu, Efficient Hardware for Tile-Based Rasterization, Nov. 2004.

M. Cox, "Architectural Implications of Hardware-Accelerated Bucket Rendering on the PC" Proceedings of the ACM SIGGRAPH/Eurographics Workshop on Graphics, 1997, pp. 25-34.

M. Olano et al., "Triangle Scan Conversion using 2D Homogeneous Coordinates" Proceedings of the ACM SIGGRAPH/Eurographcs Workshop on Graphics, 1997, pp. 89-95.

Maurice Ribble, gdc 2008, Next-Gen Tile-Based GPUs, Feb. 18-22, 2008; San Francisco.

Greene, Hierarchical Polygon Tiling with Coverage Masks, Jun. 20, 1995.

(56) References Cited

OTHER PUBLICATIONS

Hyun, Hardware-Driven Visibility Culling paper, Document No. 20073114, pp. 1-7, 2007 (http://juipter.kaist.ac.kr/~sungeui/SGA07/).
J. Foley, Computer Graphics, Second edition, 1990, pp. 668-672.
J. Pineda, "A Parallel Algorithm for Polygon Rasterization," Computer Graphics vol. 22, No. 4, Aug. 1998, pp. 17-20.
Jason Cross Publication, Intel Lifts the Larrabee Veil a Little, Tile Rendering is Back-CPUs, Boards & Components by Extreme Tech. mht. Aug. 4, 2008.
Zone Rendering—Whitepaper, Document No. 298587-001, May 2002, pp. 1-15.
Antochi, I. et al., Efficient tile-aware bounding-box overlap test for tile-based rendering dated Nov. 18, 2004, Proceedings. 2004 International Symposium on System-on-Chip, 2004.
English translation of Second Office Action dated Jan. 4, 2012, Chinese Patent Application No. CN200610130945.0.
English translation of Third Office Action dated May 14, 2012, Chinese Patent Application No. CN200610130945.0.
English translation of Chinese Office Action dated Dec. 12, 2012, Chinese Patent Application No. CN200610130945.0.
First Office Action dated Sep. 23, 2011, Chinese Patent Application No. CN200710306692.2.
English translation of First Office Action dated May 2, 2013, Chinese Patent Application No. CN201010002994.2.
Search Report and Examination Report dated Apr. 14, 2007, Great Britain Patent Application No. GB0624311.7.
Search Report and Examination Report dated Apr. 16, 2009, Great Britain Patent Application No. GB0900700.6.
Search Report and Examination Report dated May 11, 2010, Great Britain Patent Application No. GB1000710.2.
English translation of Office Action dated Aug. 28, 2012, Japanese Patent Application No. JP2007-314022.
English translation of Office Action dated Mar. 21, 2013, Japanese Patent Application No. JP2007-314022.
English translation of Office Action dated Mar. 26, 2013, Japanese Patent Application No. JP2007-314022.
Office Action dated Nov. 18, 2011, U.S. Appl. No. 11/987,265.
Office Action dated Aug. 7, 2013, U.S. Appl. No. 11/987,265.
Office Action dated May 19, 2009, U.S. Appl. No. 11/633,647.
Office Action dated Jan. 26, 2010, U.S. Appl. No. 11/633,647.
Office Action dated Jul. 22, 2010, U.S. Appl. No. 11/633,647.
Office Action dated May 24, 2011, U.S. Appl. No. 11/633,647.
Office Action dated Mar. 27, 2013, U.S. Appl. No. 12/686,187.
English translation of Abstract of Chinese Patent No. CN1421022.
English translation of Abstract of Chinese Patent No. CN1774727.
English translation of Abstract of Chinese Patent No. CN101067869.
English translation of Abstract of Japanese Patent No. JP2002-526842.
English translation of Abstract of Japanese Patent No. JP2003-529859.
English translation of Abstract of Japanese Patent No. JP2004-348702.
English translation of Abstract of Japanese Patent No. JP2006-521612.
English translation of Abstract of Japanese Patent No. JP2008-165760.
U.S. Appl. No. 13/679,768, filed Nov. 16, 2012, "Method of and Apparatus for Processing Graphics,".
Combined Search and Examination Report dated Dec. 12, 2014 in GB Application No. GB1409839.6, 4 pages.

\* cited by examiner

METHOD OF AND APPARATUS FOR PROCESSING GRAPHICS

BACKGROUND

The technology described herein relates to a method of and apparatus for processing graphics, and in particular to such a method and apparatus for use in a tile-based graphics processing system.

As is known in the art, graphics processing is normally carried out by first splitting the scene to be displayed into a number of similar basic components or "primitives", which primitives are then subjected to the desired graphics processing operations. The graphics "primitives" are usually in the form of simple polygons, such as triangles, and are usually described by defining their vertices.

Many graphics processing systems use so-called "tile-based" rendering. In tile-based rendering, the two-dimensional render output or target (i.e. the output of the rendering process, such as an output frame to be displayed) is rendered as a plurality of smaller area sub-regions, usually referred to as "tiles". The tiles are each rendered separately (typically one-after-another). The rendered tiles are then recombined to provide the complete rendering output (e.g. frame for display). In such arrangements, the render target (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that primitives that do not appear in a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know those primitives that are actually present in a given rendering tile so as to, e.g., avoid unnecessarily rendering primitives that are not actually present in a tile. In order to facilitate this, it is known to prepare for each rendering tile a list of the primitives to be rendered for that rendering tile (e.g. that will appear in the tile). Such a "primitive-list" (which can also be referred to as a "tile list") identifies (e.g. by reference to a primitive indicator) the primitives to be rendered for the tile in question.

The process of preparing primitive lists for each tile to be rendered basically involves determining the primitives that should be rendered for a given rendering tile. This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the tile list for each tile that it falls within.) In effect, each tile can be considered to have a bin (the primitive-list) into which any primitive that is found to fall within (i.e. intersect) the tile is placed (and, indeed, the process of sorting the primitives on a tile-by-tile basis in this manner is commonly referred to as "binning").

At the most precise level, it could be determined exactly which tiles a given primitive will appear at least in part in, and the primitive then included in the primitive lists for those tiles only. This is commonly referred to as "exact" binning.

It is also known to prepare primitive-lists with a lower precision than is achieved with exact binning. This can be useful to, e.g., simplify the preparation of the primitive-lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

Once lists of primitives to be rendered (primitive-lists) have been prepared for each rendering tile in this way, the primitive-lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the render target where they are not present.

However, one drawback with the need to prepare and store primitive-lists identifying the primitives to be rendered for each tile is that depending on the distribution of the primitives for a given, e.g., frame to be rendered, the primitive-lists for different tiles to be used for the frame can be very different sizes, as can the primitive lists for tiles for different frames. This means that, e.g., a given render output or tile may have significantly different memory requirements for storing its primitive list(s) as compared to other tiles or render outputs.

The Applicants have accordingly already proposed in their UK Patent No. 2433014, which is incorporated herein by reference in its entirety, an improved tile-based rendering system, which prepares primitive lists both for single rendering tiles, and primitive lists for render target areas comprising more than one tile (i.e. primitive lists that encompass more than one rendering tile (and thereby, in effect, a larger area) of the output to be generated). In other words, as well as preparing lists of primitives that are exclusive to single rendering tiles only, primitive-lists that can and will be used for plural rendering tiles in common can be and are prepared.

The Applicants have now recognised that some additions and variations to the scheme described in their earlier patent can, at least in certain circumstances, be advantageous.

BRIEF DESCRIPTION OF THE DRAWINGS

A number of embodiments of the technology described herein will now be described by way of example only and with reference to the accompanying drawings, in which.

Like reference numerals are used for like features throughout the drawings, where appropriate.

DETAILED DESCRIPTION

Figure 1:
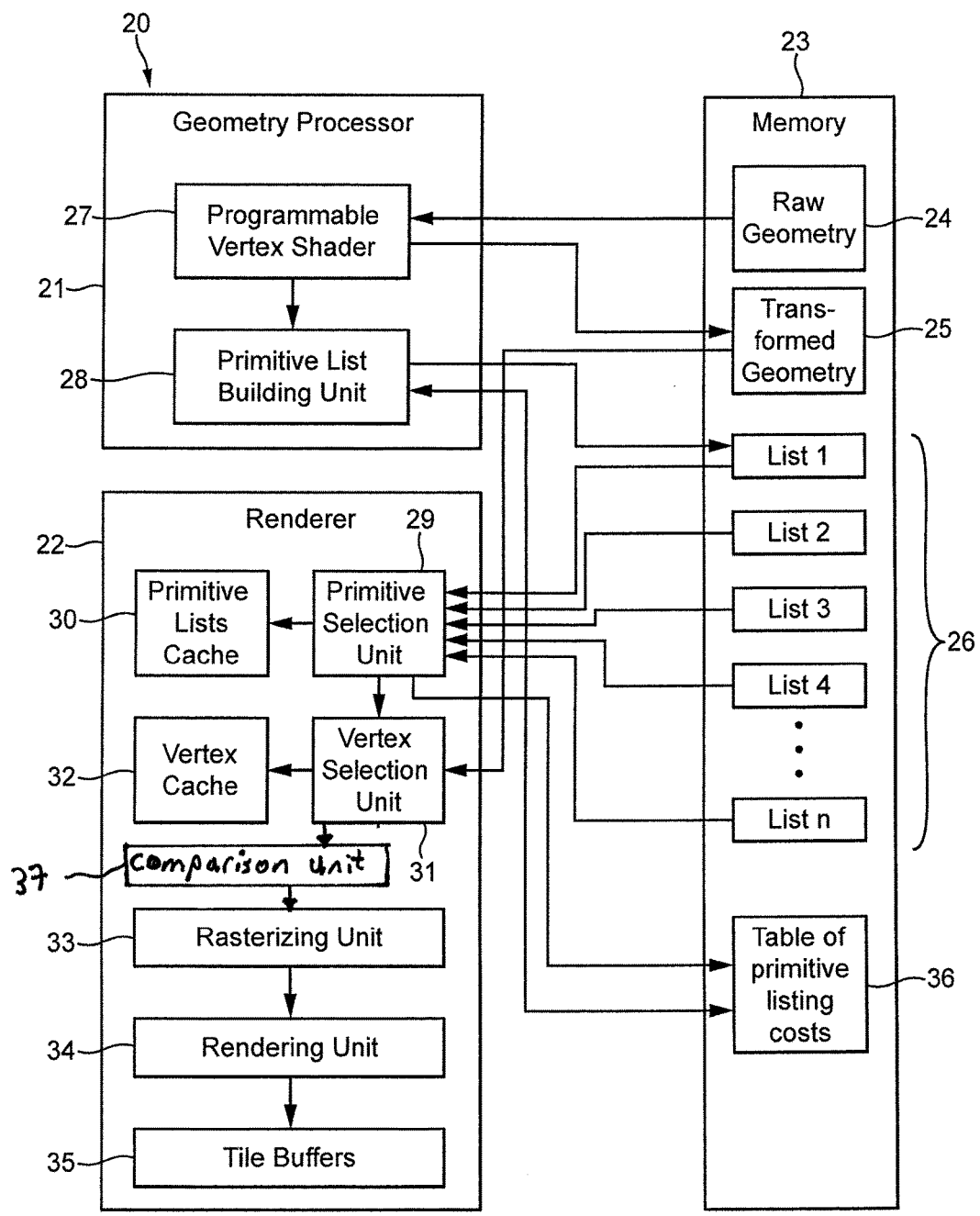
FIG. 1 shows schematically an embodiment of a graphics processor that can operate in accordance with the technology described herein.

A first embodiment of the technology described herein comprises a method of operating a tile-based graphics processing pipeline that comprises a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data, and for which primitive lists indicating primitives to be processed can be prepared for sub-regions of the area of a render target to be generated that include plural rendering tiles, the method comprising:

when rendering a tile of a render target to be generated:
reading a primitive list for a sub-region of the render target that includes plural rendering tiles and the tile being rendered to determine a primitive to be processed for the tile;
comparing the location of the primitive in the render target to the location of the tile being rendered; and
determining whether to send the primitive to the rasteriser for rasterising for the tile on the basis of the comparison.

A second embodiment of the technology described herein comprises a tile-based graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data; and
for which primitive lists indicating primitives to be processed can be prepared for sub-regions of the area of a render target to be generated that include plural rendering tiles;
the pipeline further comprising:
a primitive list reading unit that, when a tile of a render target to be generated is being rendered, reads a primitive list or lists for the tile being rendered to determine primitives to be processed for the tile; and
a comparison unit between the primitive list reading unit and the rasteriser that, at least for primitives that have been read from primitive lists for a sub-region of the render target that includes plural rendering tiles, compares the location of the primitive in the render target to the location of the tile being rendered, and determines whether to send the primitive to the rasteriser for rasterising for the tile on the basis of the comparison.

The technology described herein relates to a tile-based graphics processing system (i.e. one in which a render target is divided into plural rendering tiles for rendering purposes) that uses primitive lists that can encompass plural rendering tiles, like in the Applicants' earlier UK Patent. However, in the technology described herein, where a primitive to be processed is read from a primitive list that encompasses plural rendering tiles, a comparison between the location of the primitive in the render target and the tile being rendered is performed before the primitive is sent for rasterisation.

The Applicants have recognised that where primitive lists encompassing plural rendering tiles are being used, it can be the case that a primitive in such a list will not actually fall within all the tiles that the list encompasses. Such primitives will be identified and discarded at the rasterisation stage for a tile that they do not actually fall within, but the rasterisation process is relatively expensive. To account for this, the technology described herein performs an additional step of comparing the primitive to the tile in advance of the rasteriser, and then either sending the primitive onwards to the rasteriser (e.g. if the comparison determines that the primitive could lie at least partially within the tile) or not sending the primitive to the rasteriser (e.g. if the comparison determines that the primitive definitely does not lie within the tile at all) on the basis of the comparison. This can then avoid sending to the rasteriser for a given tile primitives that although falling within the larger area that the primitive list encompasses do not in fact actually fall within the tile in question. This can then remove a lot of unnecessary rasterisation processing of primitives that do not actually lie within the tile in question. The technology described herein can also facilitate listing primitives in primitive lists that encompass larger regions of the render output, if desired, as the potential extra rasterisation cost of doing that can be avoided or reduced.

The comparison between the location of the primitive and the tile being rendered takes place prior to rasterisation of the primitive. In an embodiment, it takes place prior to any triangle set-up, e.g., and in an embodiment, for rasterisation, such as, and in an embodiment, creating edge equations from the vertex values, being performed for the primitive (e.g. where that is done prior to the rasterisation process itself).

The comparison between the location of the primitive and the tile being rendered should be so as to assess whether the primitive could lie within the tile in question or not. In an embodiment, if it is determined by the comparison that any part of the primitive could lie within the tile, the primitive is sent onwards for rasterisation, but if it is determined that the primitive definitely does not lie within the tile (at all), the primitive is not sent for rasterisation (is discarded (culled) from processing for the tile in question) (and the next primitive (if any) to be processed for the tile is then determined, and so on). The decision of whether to send the primitive for rasterisation is in an embodiment a conservative one (such that the primitive is only not sent to the rasteriser if the comparison definitely determines that no part of the primitive lies within the tile). Thus, the comparison in an embodiment operates to assess whether the primitive definitely lies outside the tile or not (and if the comparison indicates that the primitive definitely lies outside the tile, the primitive is not sent to the rasteriser, but if it cannot be determined that the primitive definitely lies outside the tile, the primitive is sent to the rasteriser).

The comparison between the primitive's location and the tile can be performed in any suitable and desired manner. However, in an embodiment it is performed using a relatively straightforward and inexpensive process. In an embodiment the comparison uses a low (a lower) precision process (operates at a lower precision than the exact position of the primitive (does not use the exact position of the primitive) and/or tile). Thus in an embodiment the comparison does not determine and compare the exact position of the primitive and/or tile (use full precision), but uses a lower precision representation of the location of the primitive (and in an embodiment also of the tile) and compares that lower precision representation of the location of the primitive to the tile (to assess whether the primitive is outside the tile or not).

In one embodiment, the comparison uses a bounding box to represent the location of the primitive (with the location of the bounding box then being compared to the position of the tile to determine if the bounding box is outside the tile or not). This bounding box could be the same bounding box that was used to sort the primitive into the primitive list in the first place (and in one embodiment this is done—this may still be useful as even if the bounding box fell within the overall primitive list area, it may not fall within every tile that the list encompasses), but in an embodiment a different bounding box to the bounding box that was used to sort the primitive into the primitive list is used to represent the location of the primitive for the purpose of the comparison. In an embodiment both a different bounding box and the bounding box that was used to sort the primitive into the primitive list are used to represent the location of the primitive for the purpose of the comparison. In this case, each bounding box is in an embodiment checked separately and if either bounding box is outside the tile, the primitive is discarded (not sent to the rasteriser).

Where a different bounding box to the bounding box that was used to sort the primitive into the primitive list is used, that bounding box is in an embodiment effectively rotated relative to the bounding box that was used to sort the primitive into the primitive list. In an embodiment it is a bounding box derived for the primitive that is aligned to a set of axes that are rotated relative to the axes that the bounding box that was used to sort the primitive into the primitive list was aligned to. Thus, where, for example (and as would normally be the case), the bounding box that was used to sort the primitive into the primitive list was aligned to the X and Y axis (for the coordinate system being used), the different bounding box is in an embodiment aligned to a set of axes that are rotated relative to the X and Y axes. In these arrangements the different bounding box is in an embodiment aligned to a set of axes that are rotated 45 degrees relative to the axes for the bounding box that was used to sort the primitive into the primitive list (thus 45 degrees relative to the X and Y axes, for example). This is relatively straightforward to implement in hardware and should also be more effective at identifying tiles that the primitive does not actually fall within.

Similarly, in an embodiment two different bounding boxes are used to represent the location of the primitive for the purpose of the comparison. In this case, each bounding box is in an embodiment checked separately and if either bounding box is outside the tile, the primitive is discarded (not sent to the rasteriser). Where two different bounding boxes are used, each bounding box is in an embodiment effectively rotated relative to the other bounding box. In an embodiment one bounding box is aligned to a set of axes that are rotated, in an embodiment by 45 degrees, relative to the axes that the other bounding box is aligned to.

In another embodiment, the primitive's coordinates are represented using lower precision values and the comparison then uses these lower precision values for the coordinates of the primitive, e.g., and in an embodiment, to perform edge checks (tests) for the primitive against the tile. In this case, the coordinates of the tile are in an embodiment also represented using lower precision values. Thus, in an embodiment, the comparison process represents the tile's and primitive's coordinates using lower precision values, and then determines whether the primitive is outside the tile using those values, in an embodiment by testing the edges of the primitive (when so-represented) against the tile. Thus, in an embodiment, the comparison process uses lower-precision edge checking to determine if the primitive is outside the tile.

In embodiments, the lower precision representations of the coordinates indicate a range of lower precision values that the coordinate in question could have, and in an embodiment comprise a maximum value and a minimum value (in the lower precision format) that the coordinate in question could have (and which span the "true", full precision value). In the latter case, the maximum value is in an embodiment the "true" value rounded up to the nearest lower precision value that can be represented in the lower precision format and the minimum value is in an embodiment the "true" value rounded down to the nearest lower precision value that can be represented in the lower precision format.

In embodiments, the position of each vertex of the primitive is represented as a minimum and a maximum lower precision value, and the position of the tile is in an embodiment represented as a range in each dimension (e.g. in each of X and Y) that the tile covers in the lower precision format (in an embodiment in the form of minimum and maximum position values for each dimension (e.g. X and Y)). In an embodiment edge equations are derived for the primitives using the minimum and maximum vertex coordinates using interval arithmetic (range logic) and then edge tested against the range of positions indicated for the tile to determine if the primitive is outside the tile or not. The testing process in an embodiment uses interval arithmetic (range logic).

In this case, the results of the respective edge tests can then be used to assess whether the primitive is outside the tile or not. For example if all the tested edges fall outside the tile, it can be concluded that the primitive is outside the tile, but if at least one edge that is tested is found when tested to fall within the tile, or it is uncertain if at least one edge falls within the tile (which is a possibility where ranges and interval arithmetic is being used), then it cannot be concluded that the primitive is outside the tile.

Where the comparison process uses edge tests, then in an embodiment the results of the edge tests can also be provided to the rasteriser, as that can then allow the rasteriser to skip the processing of certain edges for a primitive, for example.

Where lower precision representations of a primitive's coordinates, etc., are used, then in an embodiment, the lower precision representation uses 5 bits of exponent and 4 to 8 bits of mantissa.

In an embodiment, both a bounding box and a lower precision coordinate comparison (test) is used. This can help, e.g., where a vertex of the primitive has a negative w value.

As discussed above, the technology described herein is applicable to tile-based graphics processing systems, in which the rendering target (such as, e.g., a frame to be displayed) is divided into plural rendering tiles for rendering purposes (is processed on a tile-by-tile basis). The tiles that the render target (output) is divided into for rendering purposes in the technology described herein can be any suitable and desired such tiles. The size and shape of the rendering tiles will, as is known in the art, normally be dictated by the tile configuration that the graphics processor is configured to use and handle.

The render target sub-regions for which primitive lists can be prepared can be arranged and configured as desired. In an embodiment plural different levels or layers of primitive lists can be prepared (with the primitive lists for each level or layer, encompassing different numbers of tiles to the other levels or layers). In an embodiment, the tiling process (the tiler) is configured to take account of the existence of the pre-rasterisation comparison process, e.g., and in an embodiment, when determining which primitive list level to tile a primitive at. For example, the tiler could select a higher level primitive list (encompassing more tiles) for a primitive based on the knowledge that with the comparison then culling the primitive from the extra tiles, that will provide faster operation than listing the primitive in more lower level (encompassing fewer tiles) primitive lists.

Although the technology described herein has been described above with particular reference to the processing of a given primitive, as will be appreciated by those skilled in the art, these processes should be performed for each primitive in the render output (e.g. frame to be displayed).

As discussed above, if a primitive is found by the comparison to not lie outside the tile, it is sent onwards for rasterising (and then rendering) for the tile in question.

The rasteriser of the graphics processing pipeline will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should process the fragments generated by the rasteriser to generate rendered fragment data for (covered) sampling points that the fragments represent, as is known in the art. These rendering processes may include, for example, fragment shading, blending, texture-mapping, etc. In an embodiment the renderer is in the form of or includes a programmable fragment shader.

The pipeline should also include a tile buffer for storing, as is know in the art, an array or arrays of sample values for the tile in question. These sample values are usually, and in an embodiment are, grouped into sets of sample values (such as groups of 2×2 sample values) that are each associated with a respective (e.g. display) pixel in the tile in question. The sample values may, e.g., comprise colour values (a colour buffer), depth values (a depth buffer), etc.

There should also be a write out unit that operates to write the data in the tile buffer (once the data in the tile buffers is complete) out to external (main) memory (e.g. to a frame buffer), as is known in the art. This may include, as is known in the art, downsampling (averaging), either in a fixed or in a variable fashion, the sample values in the tile buffer to the final output (pixel) value to be written to the main memory (e.g. frame buffer) and/or other output, if desired.

The rendering process may be and in an embodiment is carried out in a similar manner to known tile-based rendering systems. Thus, in an embodiment, each rendering tile is processed and rendered separately, i.e. the separate, individual tiles are rendered one-by-one. This rendering can be carried out in any desired manner, for example, by rendering the individual tiles in succession or in a parallel fashion. Once all the tiles have been rendered, they can then be recombined, e.g., in a frame buffer, e.g. for display, as is known in the art.

The graphics processing pipeline may also contain any other suitable and desired processing stages that a graphics processing pipeline may contain such as an early depth (or an early depth and stencil) tester, a late depth (or depth and stencil) tester, a blender, etc.

The technology described herein can be used for all forms of output that a graphics processing pipeline may be used to generate, such as frames for display, render-to-texture outputs, etc.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a graphics processor 20 that may be operated in accordance with the technology described herein. FIG. 1 shows the main elements and pipeline stages of the graphics processing pipeline 20 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

The graphics processor 20 includes a geometry processor 21, and a renderer 22, both of which can access a memory 23. The memory 23 may be, as is known in the art, "on-chip" with the geometry processor 21 and renderer 22, or may be an external memory that can be accessed by the geometry processor 21 and renderer 22.

The memory 23 stores, inter alia, and as shown in FIG. 1, a set of raw geometry data 24 (which is, for example, provided by the graphics processor driver or an API running on a host system (microprocessor) of the graphics processor 20, as is known in the art), a set of transformed geometry data 25 (which is the result of various transformation and processing operations carried out on the raw geometry 24, again, as is known in the art), and a set of primitive lists 26. The primitive lists 26 contain data, commands, etc., for the respective primitives. This process will be described in more detail below.

The transformed geometry data 25 comprises, for example, transformed vertices (vertex data), etc., as is known in the art.

The geometry processor 21 comprises, inter alia, a programmable vertex shader 27, and a primitive list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for 2D placement in the render output (e.g. frame to be displayed). The programmable vertex shader 27 and the processes it carries out can take any suitable form and be any suitable and desired such processes known in the art.

The primitive list building unit 28 allocates the primitives to the primitive lists which are then used by the renderer 22 to identify the primitives that should be rendered for each tile that is to be rendered to generate the render output (which in this embodiment is a frame to be rendered for display). To do this, the primitive list building unit 28 takes as its input the transformed and processed vertex data from the programmable vertex shader 27 (i.e. the positions of the primitives in the frame), builds primitive lists using that data, and stores those lists as the primitive lists 26 in the memory 23. This process will be described in more detail below.

The renderer 22 includes a primitive selection unit 29, a primitive list cache 30, a vertex selection unit 31, a vertex data cache 32, a rasterising unit 33, a rendering unit 34, and tile buffers 35.

The rasterising unit 33, rendering unit 34, and tile buffers 35 operate, in this embodiment, in the usual manner for such units in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to an output render target, such as a frame buffer for a display.

The primitive selection unit 29 of the renderer 22 determines which primitive is to be rendered next. It does this by considering the primitive lists 26 stored in the memory 23, and selecting from one of those lists the next primitive to be rendered. This selection process again will be described in more detail below.

The primitive selection unit 29 can also place one or more primitive lists in the primitive list cache 30.

The primitive selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to a comparison unit 37. The operation of this comparison unit is described in more detail below. The vertex selection unit 31 can cache vertex data that it has retrieved from the memory 23 in the vertex data cache 32, if desired.

Primitives that "pass" the comparison unit test are then sent to the rasterising unit 33 for rasterisation. The rasterising unit 33 then rasterises the primitive to fragments, and provides those fragments to the rendering unit 34 for rendering. The rendering unit 34 performs a number of rendering processes, such as texture mapping, blending, shading, etc. on the fragments, to generate rendered fragment data for the fragments representing the primitive, and stores the rendered fragment data in the tile buffers 35 for providing to an output render target, such as a frame buffer for a display.

The operation of the primitive list building unit 28 and the preparation of the primitive lists 26 will now be described in more detail with reference to FIG. 2.

As discussed above, the technology described herein is applicable to a rendering system in which the render target (e.g. a frame to be rendered) is rendered as plural individual rendering tiles. Furthermore, as well as the render target being divided into tiles for rendering purposes, the render target area is also divided into plural sets of sub-regions for which separate (different) primitive lists (i.e. list of primitives to be rendered) can be and are prepared.

Figure 2:
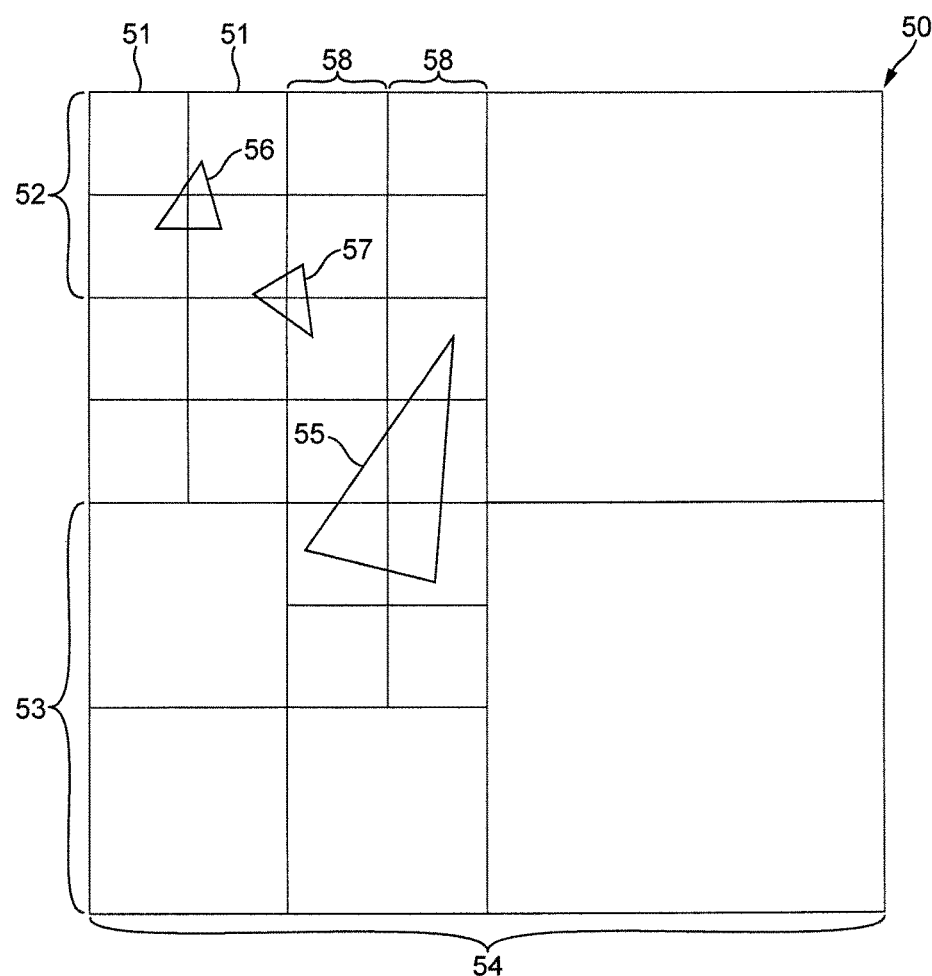
FIG. 2 shows schematically a set of primitives in a frame to be rendered.

FIG. 2 illustrates an embodiment of an arrangement of the sets of render target sub-regions for which primitive lists can be prepared that can be used with the present embodiment.

FIG. 2 shows a render target 50 (e.g. a frame to be displayed) that is divided into plural individual rendering tiles 51 for rendering purposes. (It should be noted here that FIG. 2 does not show all the individual rendering tiles 51 that the render target 50 is divided into, but only a few of those rendering tiles. This is for clarity purposes. However, the entire render target 50 is divided into equal rendering tiles 51 in practice.)

In this embodiment, a primitive list can be prepared for each rendering tile individually (i.e. there is a primitive list that is exclusive to each rendering tile 51). Thus, the system has a first set of render target area sub-regions 58 for which primitive lists can be prepared, in which each sub-region 58 in the set corresponds to a respective single rendering tile 51.

As well as the individual rendering tile 51 render target sub-regions 58, the render target 50 is also overlaid by sets of render target sub-regions whose respective sub-regions contain differing groups of plural rendering tiles 51. These sets of plural rendering tile sub-regions are in effect laid over the render target 50 to provide layers having different (area) divisions of the overall render target area.

Thus, as shown in FIG. 2, there is a set ("layer") of sixteen render target sub-regions 52 each comprising 2×2 rendering tiles 51. There is then another, lower resolution set (layer) comprising four sub-regions 53 each of 4×4 rendering tiles. Finally, there is a set of sub-regions comprising one sub-region 54 which encompasses the entire render target area (and thus encompasses the 8×8 rendering tiles of the render target).

FIG. 2 also shows for illustrative purposes three primitives 55, 56 and 57 which are to be rendered and which accordingly need allocating to primitive lists for rendering.

(Again, as will be appreciated by those skilled in the art, in practice any given render output, e.g., frame, to be rendered will typically comprise many more primitives than the three primitives shown in FIG. 2. However, FIG. 2 shows three primitives only for simplicity and clarity purposes.)

As discussed above, and as is known in the art, in a system where the render target 50 to be rendered is divided into smaller rendering tiles 51 for rendering purposes, it is necessary for the system to be able to identify which primitives should be rendered for each rendering tile. This is done, as is known in the art, by providing so-called primitive lists, which identify for each rendering tile the primitives that should be rendered for that rendering tile.

In the present embodiment, the primitive list building unit 28 prepares a primitive list for each individual rendering tile sub-region 58, a separate primitive list for each 2×2 rendering tile sub-region 52, a separate primitive list for each 4×4 rendering tile sub-region 53, and a separate primitive list for the 8×8 rendering tile sub-region 54 that covers the entire render target 50. To do this, the primitive list building unit 28 takes each primitive in turn, determines a location for that primitive, compares the primitive's location with the locations of (the render target area covered by) the sub-regions 58, 52, 53 and 54, and then allocates the primitive to the respective primitive lists 26 for the sub-regions in an appropriate manner.

The primitive list building unit 28 determines the location of each primitive and accordingly the sub-regions that a given primitive falls within or intersects using, in this embodiment, a bounding box binning technique. Thus, as is known in the art, the primitive list building unit 28 uses the determined transformed vertex positions it is provided with for a given primitive by the programmable vertex shader 27 to construct a bounding box for the primitive and then identifies which sub-regions the primitive's bounding box falls within (intersects). In the present embodiment, the bounding box for each primitive is determined as a simple rectangle. This process can be carried out in any suitable and desired manner, such as by using techniques already known for this purpose in the art. The bounding box for a primitive is in an embodiment generated as part of the primitive listing process, e.g., by the primitive list building unit, but other arrangements would, of course, be possible.

In the present embodiment, the primitive list building unit 28 uses a cost function assessment for different possible primitive listing (binning) solutions for a given primitive to determine which primitive lists (the primitive lists of which render target sub-regions) to list the primitive in. To do this, the primitive list building unit 28 estimates the writing and reading cost of listing the primitive for rendering using different possible sets of render target sub-regions (i.e. at different possible hierarchy levels), and then uses the estimated costs to determine the set of render target sub-regions (the hierarchy level) at which to list (bin) the primitive. Other arrangements would, of course, be possible.

The primitive list building unit 28 places the primitives in the primitive lists 26 in the order that it receives the primitives from the programmable vertex shader 27. This means that, so far as each individual primitive list 26 is concerned, the primitives in the list are in the order that they were generated, which will, as is known in the art, typically correspond to the desired order of rendering the primitives. (As is known in the art, when primitives are generated for rendering, they are usually generated by the host driver or API in the order that it is desired to render the primitives and are provided to the graphics processor in that order. Thus, as the primitive list building unit 28 takes the primitives in turn as they are received, it will place the primitives in the individual tile lists in rendering order so far as each individual primitive list is concerned.)

The primitive list building unit 28, at the same time as it places a primitive in the appropriate primitive list or lists, also allocates to and associates with the primitive in the primitive list 26 an index for the primitive. The primitive list building unit 28 has a counter for this purpose, and simply allocates to the primitives as they are rendered the current count of the counter. The present embodiment can be configured to increment the index for each new primitive, or to only change (increment) the index allocated to a primitive when a primitive is being listed in a new set of sub-regions (i.e. when the hierarchy level at which the primitives are being listed changes (i.e. differs to the set of sub-regions (the hierarchy level) for the preceding primitive)).

In this way, each primitive is numbered (in ascending order in this embodiment) in the order in which it was received by the primitive list building unit 28 (i.e. in the order in which the primitives are provided by the host driver or API, etc., i.e. the order in which it is desired for the primitives to be rendered). The indices allocated by the primitive list building unit 28 to each primitive are used by the primitive selection unit 29, as will be discussed further below, to identify and select the next primitive for rendering from the primitive lists 26 in the memory 23.

Once the primitive list building unit 28 has finished building the primitive lists 26 and stored those lists in the memory 23, and the programmable vertex shader 27 has completed the transformation of the geometry data to provide a complete set of transformed geometry data 25 in the memory 23, for the render output (e.g. frame) to be rendered, the renderer 22 can then render the output (e.g. frame). This process will now be described.

As discussed above, in the present embodiment, the rendering process is performed on a rendering tile by rendering tile basis, i.e. each rendering tile 51 of the render output is rendered individually in turn, and the rendered tiles are combined to provide the overall render output (e.g. frame for display).

Thus, the renderer 22 is first provided with the identity of the rendering tile to be rendered and uses this to configure itself appropriately. In particular, the stored primitive lists 26 that apply to the rendering tile that is to be rendered, i.e., in the present embodiment, the primitive list that is exclusive to the individual rendering tile that is to be rendered, the primitive list for the 2×2 rendering tile sub-region that includes the rendering tile that is to be rendered, the primitive list for the 4×4 rendering tile sub-region that includes the rendering tile that is to be rendered, and the primitive list for the 8×8 rendering tile sub-region that covers the entire render target (and therefore that must cover the individual rendering tile that is currently to be rendered), are identified. In the present embodiment, the stored primitive lists that apply to the tile being rendered are indicated by including pointers to the relevant primitive lists in the "new tile" command that is sent when a tile is first to be rendered. (Other arrangements would, of course, be possible.)

The renderer then proceeds to render the tile in question.

The first stage in the rendering process is for the primitive selection unit 29 to select a primitive to be rendered. To do this, the primitive selection unit 29 reads the stored primitive lists 26 that have been determined as applying to the tile that is currently being rendered, i.e., in the present embodiment, as discussed above, the primitive list 26 that is exclusive to the individual rendering tile that is being rendered, the primitive list for the 2×2 rendering tile sub-region that includes the tile that is being rendered, the primitive list for the 4×4 rendering tile sub-region that includes the tile that is being rendered, and the primitive list for the 8×8 rendering tile sub-region that covers the entire render target. The primitive lists are read in a first-in, first-out order by the primitive selection unit 29, i.e. such that, in effect, the first primitive in a list is read, and then, once that primitive has been sent for rendering, the second primitive in the list is read, and so on.

To select the next primitive to be rendered, the primitive selection unit 29 determines the indexes that have been allocated to the next primitive to be rendered in each primitive list for the tile being rendered, compares those indices, and selects the lowest index primitive as the next primitive to be rendered (since, as discussed above, the primitives are indexed by the primitive list building unit 28 in ascending order, i.e. such that the lowest numbered primitive is the next primitive to be rendered for the desired rendering order).

Thus the primitive selection unit 29 will read in the index of the next primitive in the primitive list for the single rendering tile sub-region in question, the index of the next primitive in the primitive list for the relevant 2×2 rendering tile sub-region, the index of the next primitive in the primitive list for the appropriate 4×4 rendering tile sub-region, and so on, compare those indices, and select the primitive with the lowest index for rendering next. (The primitive selection unit 29 only needs to read the index of one primitive (the next primitive) from each primitive list at any one time, since, as discussed above, within the individual primitive lists, the primitives are already listed in the correct rendering order.) In effect, the primitives can be thought of as being streamed one-by-one to the primitive selection unit in order from the stored primitive lists, on a first-in, first-out basis.

Once the primitive selection unit 29 has selected the primitive to be rendered, it passes that primitive to the vertex selection unit 31. The vertex selection unit 31 then retrieves the appropriate transformed geometry data for the vertices of the primitive in question from the transformed geometry data 25 stored in the memory 23, and provides that data to the comparison unit 37.

The comparison unit 37 operates to compare the position of the primitive against the position of the tile that is being processed to determine if the primitive lies within the tile or not. This is done because the Applicants have recognised that where primitive lists that encompass plural tiles are used, it can be possible for a primitive not to fall within all the tiles that the primitive list relates to, even if the primitive is listed in the primitive list.

Figure 3:
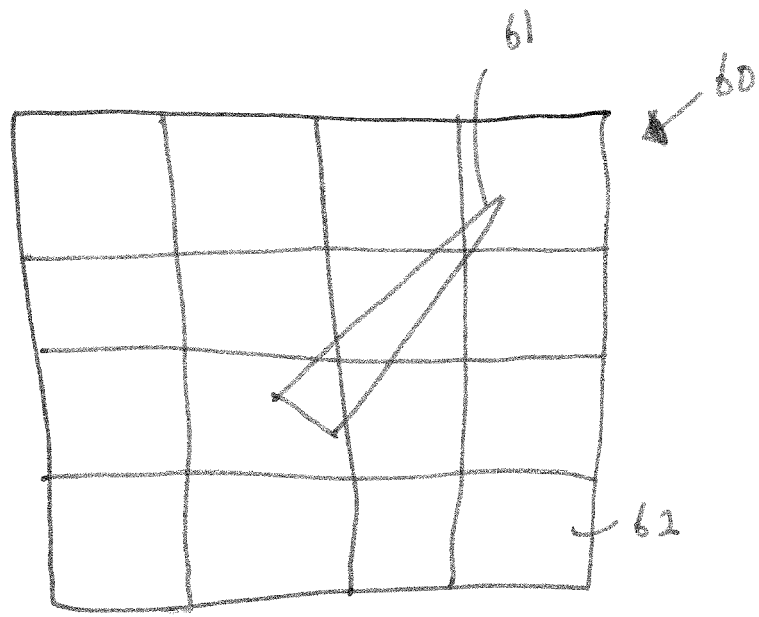
FIGS. 3, 4, and 5 illustrate the operation of the comparison unit of an embodiment of the technology described herein.

FIG. 3 illustrates this and shows an exemplary 4×4 tile sub-region 60 for which a primitive list has been prepared and an exemplary primitive 61 within that sub-region that has been included in the primitive list. As can be seen in FIG. 3, although the primitive 61 is within the 4×4 tile sub-region 60, it does not fall within all the tiles of that 4×4 tile sub-region. If the tiles in the 4×4 sub-region 60, such as the tile 62, that the primitive does not fall within can be identified, then the (unnecessary) processing of the primitive 61 for those tiles can be avoided. The comparison unit 37 operates to attempt to identify such situations, by comparing the location of each primitive to the tile being rendered before the primitive is sent to the rasteriser 33 for rasterising.

Two embodiments of the operation of the comparison unit 37 will now be described.

In the first embodiment, the comparison unit 37 uses bounding boxes to determine whether the primitive is definitely outside the tile or not. In this case, two overlapping bounding boxes are used, the first being an X and Y axis aligned bounding box corresponding to the bounding box that was used when sorting the primitive into the primitive lists, and the second being a bounding box for the primitive that is aligned to axes rotated 45 degrees relative to the X and Y axes.

Figure 4:
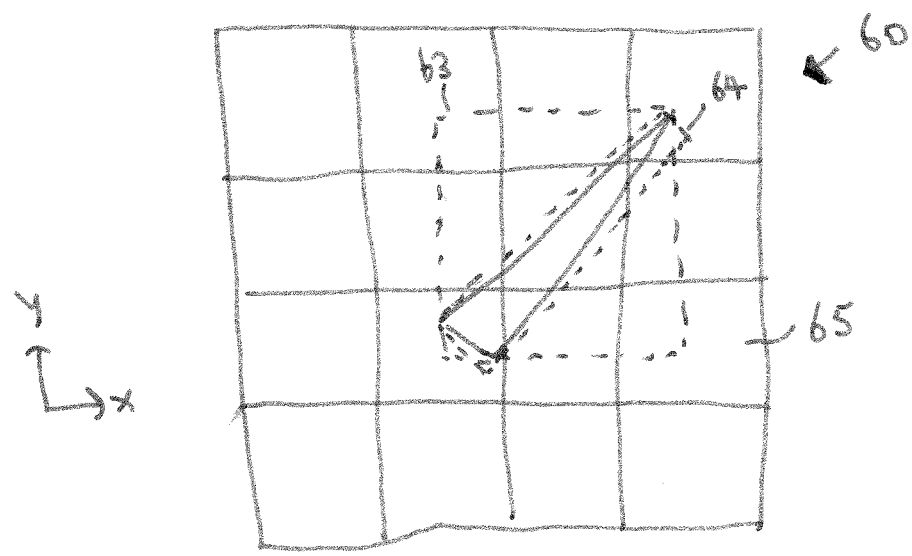

FIG. 4 illustrates this and shows the two bounding boxes 63, 64 for the primitive 61. If the tile falls outside either bounding box, the primitive 61 is discarded for the tile in question. It can be seen that in the example shown in FIG. 4, the primitive 61 will not be processed for the tile 65, for example.

In the present embodiment, the bounding box generation and testing procedure is performed as follows.

Given the vertices (x0,y0), (x1,y1), (x2,y2) for the primitive and a tile bounding box having upper and lower bounds (bb_x0,mm_y0) and (bb_x1,bb_y1), the X and Y axis aligned bounding box for the primitive is first determined as:

$$min\_x=min(x0,x1,x2)$$

$$max\_x=max(x0,x1,x2)$$

$$min\_y=min(y0,y1,y2)$$

$$max\_y=max(y0,y1,y2)$$

The area covered by primitive's bounding box is then compared to the area that the tile occupies and the primitive is discarded if the range from (min_x,min_y) to (max_x, max_y) is outside of the tile bounding box (the range from (bb_x0,mm_y0) to (bb_x1,bb_y1)).

If the primitive is not discarded, a second bounding box aligned to axes rotated 45 degrees relative to the X and Y axes is derived and tested. This is done as follows.

First rotate all the primitive's vertices $$x0\_rot,y1\_rot=(x0-y0,x0+y0)$$

$$x1\_rot,y1\_rot=(x1-y1,x1+y1)$$

$$x2\_rot,y2\_rot=(x2-y2,x2+y2)$$

Then rotate the tile border $$bb\_x0\_rot,bb\_y0\_rot=(bb\_x0-bb\_y0,bb\_x0+bb\_y0)$$

$$bb\_x1\_rot,bb\_y1\_rot=(bb\_x1-bb\_y1,bb\_x1+bb\_y1)$$

$$bb\_x2\_rot,bb\_y2\_rot=(bb\_x2-bb\_y2,bb\_x2+bb\_y2)$$

The rotated bounding box is then compared to the rotated tile border and the primitive discarded if the rotated bounding box is not within the rotated tile border.

It should be noted here that this testing can be done using low precision rotation and using adders only.

In another embodiment, the comparison unit 37, instead of using bounding boxes, uses range logic (interval arithmetic) at a lower precision to assess if a primitive is within a tile or not.

(Range logic (interval arithmetic) is similar to exact logic except that it represents a range of possible values for the result. Some range logic examples are:

Exact number multiply: 4.5*2.1=9.45
Range logic multiply: [4, 6]*[2, 3]=[4*2, 6*3]=[8, 18] (special cases may apply for ranges <0)
Exact number add: 2.5+5.4=7.9
Range logic add: [2, 3]+[4, 6]=[2+4, 3+6]=[6, 9]

In the case where the new range cannot be represented in the low precision, it is expanded: for example from [6, 9] to [6, 10].)

Using range logic it can be deemed if a triangle is within a tile, outside a tile, or "maybe" within the tile (if the range crosses 0).

The range logic in the present embodiment uses 5 bits of exponent and 4-8 bits of mantissa. Depending on the precision of the range logic, the number of tiles that can be accurately deemed inside the primitive or not varies. Using 4 mantissa bits has been found to give similar precision to the bounding box embodiment discussed above, while increasing to 8 mantissa bits has been found to get close to the precision of exact binning.

The procedure for testing primitive against a tile in this embodiment is as follows:

Using range logic:
1) Represent all x,y vertex values of the primitive at a lower resolution floating point.
2) Represent the entire tile x,y range with the same precision floating point range values.
3) Calculate the 3 edge vectors for the primitive using range logic.
4) Calculate the position relative to the tile for each vertex of the primitive using range logic.
5) For all primitive edges, calculate the cross product between the closest tile relative vertex position on the edge and the edge vector using range logic, and keep a two bit state per edge: −1: range crosses 0, 0: range >0, 1: range <0
6) If all the edge states equal 0 or all equal 1 then the primitive is within the tile (and so should be sent to the rasteriser). If at least one edge's state is 0 and at least one other edge's state is 1 then the primitive does not belong to the tile (and so can be discarded for the tile in question). Otherwise it is uncertain if the primitive belongs to the tile (and so the primitive is sent to the rasteriser).

In the present embodiment, the range multiply is simplified to use symmetric ranges so no more than two multiplications are needed to find the resulting range of a ranged multiply, all minimum range values use round down and all maximum range values use round up.

In this embodiment, if a vertex has negative w then it may be necessary to determine if a primitive is ccw (counterclockwise) or cw (clockwise) in order to know which of all edge states equal 0 or all equal 1 is inside or outside the tile. Alternatively a combination of range logic and a bounding box will work well for most cases. (Or such a primitive could simply automatically be sent to the rasteriser.)

Where the range logic test is able to determine if a tile is completely inside the primitive or if only one or two primitive edges are likely to be crossing the tile, this information is in an embodiment passed to the rasteriser for use, e.g., to skip rasterisation completely or partially depending on the number of edges that passed the inside/outside test.

Other arrangements would, of course, be possible.

Figure 5:
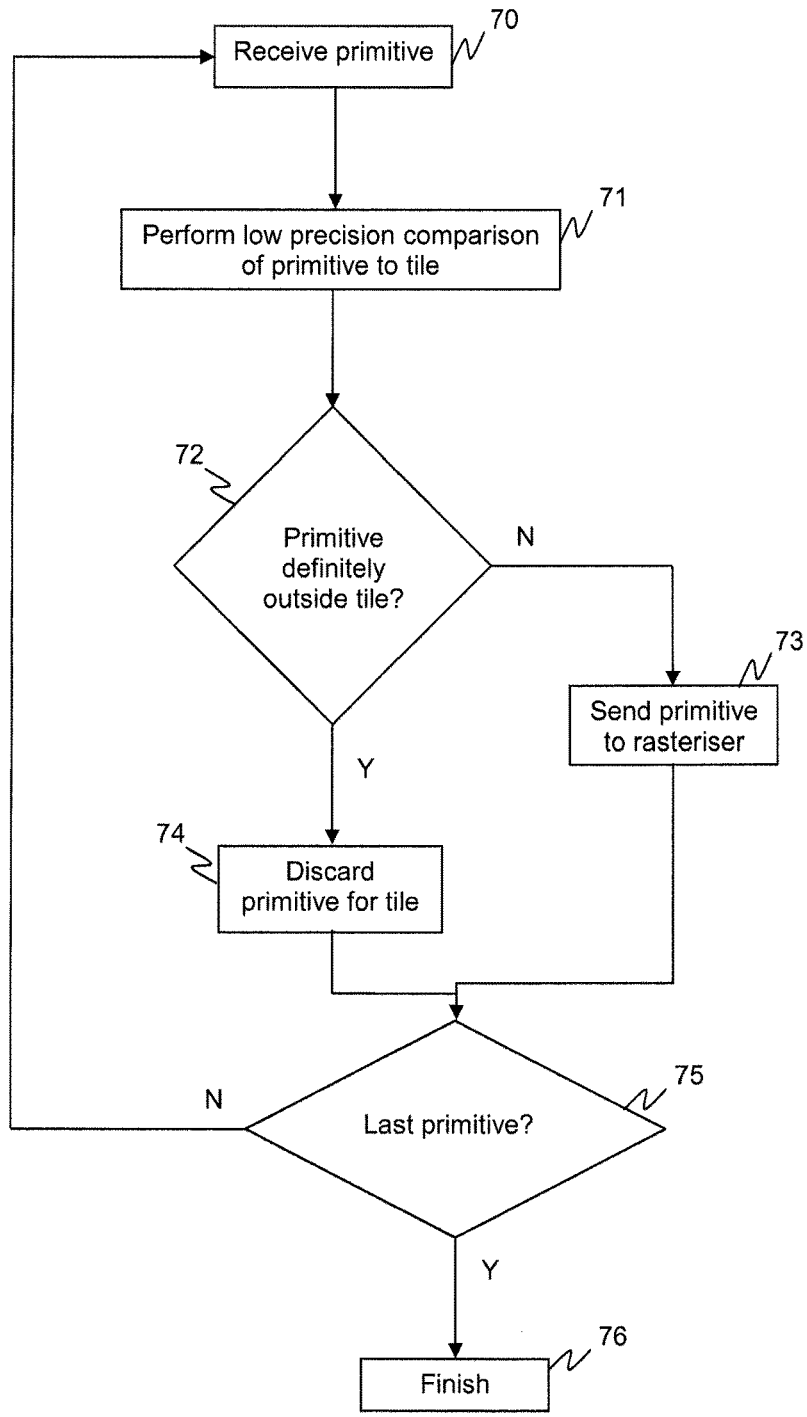

FIG. 5 shows schematically the operation of the comparison unit 37. As shown in FIG. 5, when the comparison unit 37 receives a primitive for processing (step 70), it performs a low precision comparison of the primitive to the tile (step 71) to determine if the primitive definitely lies outside the tile (step 72) (at the level of precision being considered). If the primitive is determined to definitely lie outside the tile, it is discarded from processing for the tile (step 74), but if the primitive is not determined to definitely lie outside the tile, it is sent to the rasteriser for processing for the tile (step 73). The process is continued until all the primitives have been processed (steps 75, 76).

As discussed above, if it cannot be determined by the comparison unit 37 that the primitive is definitely outside the tile, the comparison unit sends the primitive to the rasterizer 33. The primitive is then rasterised and rendered, and the resulting rendered primitive data stored appropriately in the tile buffers 35 as discussed above, and as is known in the art.

The process is then repeated, i.e. the primitive selection unit 29 again reads the index of the next primitive of each relevant primitive list, selects the primitive with the lowest index, and provides that primitive to the vertex selection unit 31, and so on.

This process is repeated for all the primitives that need to be rendered for a given rendering tile (i.e. that are included in primitive lists 26 appropriate to the tile) until all the primitives for the tile have been rendered (and so the tile buffers contain all the rendered data for the tile in question). The rendered tile data can then be written out (exported) to external memory, such as a frame buffer in main memory (not shown), as is known in the art.

The renderer 22 then renders the next rendering tile in the same manner, and so on, until all the individual rendering tiles for the render output have been rendered (and written out to external memory, such as a frame buffer).

Once all the tiles for the render output have been rendered, the combined set of rendered tiles may then be provided as the render output, e.g., to a display device for display, as is known in the art. The process is then repeated for the next render output (e.g. frame) to be generated, and so on.

As will be appreciated by those skilled in the art, the present embodiment (and the technology described herein) can be implemented in any tile-based rendering system, as desired. The various components and functions of the present embodiment and the technology described herein can similarly be implemented as desired and using any suitable techniques known in the art.

It can be seen from the above that the technology described herein, in its embodiments at least, provides an improved primitive processing arrangement for tile-based rendering systems in which primitives can be included in primitive lists that include plural rendering tiles and that in particular facilitates avoiding sending to the rasteriser primitives that although falling within the area encompassed by a primitive list in, are not actually within the tile currently being processed.

This is achieved, in embodiments of the technology described herein at least, by using a low cost pre-processing unit that can cull such primitives before they are sent for rasterisation. As the pre-processing is low cost, the additional pre-processing does not outweigh the savings gained by avoiding sending primitives unnecessarily for rasterisation.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a tile-based graphics processing pipeline that comprises a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data, and for which primitive lists indicating primitives to be processed can be prepared for sub-regions of the area of a render target to be generated that include plural rendering tiles, the method comprising:
  when rendering a tile of plural rendering tiles that a render target to be generated is divided into:
  reading a primitive list for a sub-region of the render target, wherein the sub-region includes plural rendering tiles and the tile being rendered of the plural rendering tiles that the render target is divided into;
  based on the reading the primitive list for the sub-region of the render target, determining a primitive to be processed for the tile being rendered;
  after the determining the primitive to be processed for the tile based on the reading the primitive list for the sub-region:
  generating a lower precision representation of the location of the determined primitive;
  comparing the generated lower precision representation of the location of the determined primitive in the render target to the location of the tile being rendered; and
  determining whether to send the determined primitive to the rasteriser for rasterising for the tile on the basis of the comparison, wherein when the comparison indicates that the generated lower precision representation of the location of the determined primitive in the render target definitely lies outside the tile being rendered, the determined primitive is not sent to the rasteriser;
  wherein generating a lower precision representation and comparing the generated lower precision representation of the location of the determined primitive in the render target to the location of the tile being rendered comprises one of:
    (i) generating a bounding box to represent the location of the primitive; and
    comparing the location of the bounding box of the determined primitive in the render target to the location of the tile being rendered;
    wherein the bounding box used to represent the location of the primitive in these steps is a different bounding box to the bounding box that was used to sort the primitive into the primitive list; and
    (ii) representing the x and y coordinates of the primitive using lower precision values; and
    using these lower precision values of the x and y coordinates of the primitive when performing the comparison.

2. The method of claim 1, wherein if the comparison cannot determine that the primitive definitely lies outside the tile, the primitive is sent to the rasteriser.

3. The method of claim 1, wherein both a different bounding box and the bounding box that was used to sort the primitive into the primitive list are used to represent the location of the primitive for the purpose of the comparison.

4. The method of claim 1, wherein the different bounding box to the bounding box that was used to sort the primitive into the primitive list is a bounding box derived for the primitive that is aligned to a set of axes that are rotated relative to the axes that the bounding box that was used to sort the primitive into the primitive list was aligned to.

5. The method of claim 1, wherein the comparison process represents the tile's and the primitive's x and y coordinates using lower precision values, and then determines whether the primitive is outside the tile using those values, by testing the edges of the primitive when so-represented against the tile.

6. The method of claim 1, wherein the lower precision representations of the x and y coordinates indicate a range of lower precision values that the x or coordinate in question could have and the comparison process uses interval arithmetic to compare the location of the primitive to the location of the tile.

7. The method of claim 1, wherein primitive lists can be prepared for plural different levels of primitive list, with the primitive lists for each level encompassing different numbers of tiles to the other levels; and the primitive list preparing process takes account of the existence of the pre-rasterisation comparison process when determining which primitive list level to list a primitive at.

8. A tile-based graphics processing pipeline for which primitive lists indicating primitives to be processed can be prepared for sub-regions of the area of a render target to be generated that include plural rendering tiles, the pipeline comprising:
    processing circuitry, including at least a rasteriser that rasterises input primitives to generate graphics fragments to be processed, each graphics fragment having one or more sampling points associated with it, and a renderer that processes fragments generated by the rasteriser to generate rendered fragment data;
    primitive list reading circuitry that, when a tile of plural rendering tiles that a render target to be generated is divided into is being rendered, reads a primitive list for a sub-region of a render target, wherein the sub-region includes plural rendering tiles and the tile being rendered of the plural rendering tiles that the render target is divided into, to determine primitives to be processed for the tile being rendered; and
    lower precision representation generating circuitry that generates, for a primitive determined to be processed for a tile being rendered by the primitive list reading circuitry, a lower precision representation of the location of the determined primitive; and
    comparison circuitry between the lower precision representation generating circuitry and the rasteriser that, for a primitive determined to be processed for a tile being rendered by the primitive list reading circuitry, compares the generated lower precision representation of the location of the determined primitive in the render target determined by the lower precision representation generating circuitry to the location of the tile being rendered, and determines whether to send the primitive to the rasteriser for rasterising for the tile on the basis of the comparison, wherein when the comparison indicates that the generated lower precision representation of the location of the determined primitive in the render target definitely lies outside the tile being rendered, the determined primitive is not sent to the rasteriser;
    wherein generating a lower precision representation and comparing the generated lower precision representation of the location of the determined primitive in the render target to the location of the tile being rendered comprises one of:
        (i) the lower precision representation generating circuitry generating a bounding box to represent the location of the primitive; and
        the comparison circuitry comparing the location of the bounding box of the determined primitive in the render target to the location of the tile being rendered;
        wherein the bounding box used to represent the location of the primitive in these steps is a different bounding box to the bounding box that was used to sort the primitive into the primitive list; and
        (ii) the lower precision representation generating circuitry representing the x and y coordinates of the primitive using lower precision values; and
        the comparison circuitry using these lower precision values of the x and y coordinates of the primitive when performing the comparison.

9. The pipeline of claim 8, wherein if the comparison cannot determine that the primitive definitely lies outside the tile, the primitive is sent to the rasteriser.

10. The pipeline of claim 8, wherein both a different bounding box and the bounding box that was used to sort the primitive into the primitive list are used to represent the location of the primitive for the purpose of the comparison.

11. The pipeline of claim 8, wherein the different bounding box to the bounding box that was used to sort the primitive into the primitive list is a bounding box derived for the primitive that is aligned to a set of axes that are rotated relative to the axes that the bounding box that was used to sort the primitive into the primitive list was aligned to.

12. The pipeline of claim 8, wherein the comparison unit converts the tile's and the primitive's x and y coordinates to lower precision values, and then determines whether the primitive is outside the tile using those values, by testing the edges of the primitive when so-represented against the tile.

13. The pipeline of claim 8, wherein the lower precision representations of the x and y coordinates indicate a range of lower precision values that the x or coordinate in question could have and the comparison unit uses interval arithmetic to compare the location of the primitive to the location of the tile.

14. The pipeline of claim 8, wherein primitive lists can be prepared for plural different levels of primitive list, with the primitive lists for each level encompassing different numbers of tiles to the other levels; and the primitive list preparer takes account of the existence of the pre-rasterisation comparison process when determining which primitive list level to list a primitive at.

15. A non-transitory computer readable storage medium storing computer software code which when executing on a processor performs a method of operating a tile-based graphics processing pipeline that comprises a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data, and for which primitive lists indicating primitives to be processed can be prepared for sub-regions of the area of a render target to be generated that include plural rendering tiles, the method comprising:

when rendering a tile of plural rendering tiles that a render target to be generated is divided into:

reading a primitive list for a sub-region of the render target, wherein the sub-region includes plural rendering tiles and the tile being rendered of the plural rendering tiles that the render target is divided into;

based on the reading the primitive list for the sub-region of the render target, determining a primitive to be processed for the tile being rendered;

after the determining the primitive to be processed for the tile based on the reading the primitive list for the sub-region, generating a lower precision representation of the location of the determined primitive;

comparing the generated lower precision representation of the location of the determined primitive in the render target to the location of the tile being rendered; and determining whether to send the determined primitive to the rasteriser for rasterising for the tile on the basis of the comparison, wherein if the comparison indicates that the generated lower precision representation of the location of the determined primitive in the render target definitely lies outside the tile being rendered, the determined primitive is not sent to the rasteriser;

wherein generating a lower precision representation and comparing the generated lower precision representation of the location of the determined primitive in the render target to the location of the tile being rendered comprises one of:

(i) generating a bounding box to represent the location of the primitive; and comparing the location of the bounding box of the determined primitive in the render target to the location of the tile being rendered;

wherein the bounding box used to represent the location of the primitive in these steps is a different bounding box to the bounding box that was used to sort the primitive into the primitive list; and (ii) representing the x and y coordinates of the primitive using lower precision values; and using these lower precision values of the x and y coordinates of the primitive when performing the comparison.

* * * * *